(No Model.)   3 Sheets—Sheet 1.
E. F. GROSSÉ.
TRAP DOOR STAIRS.
No. 527,852.   Patented Oct. 23, 1894.
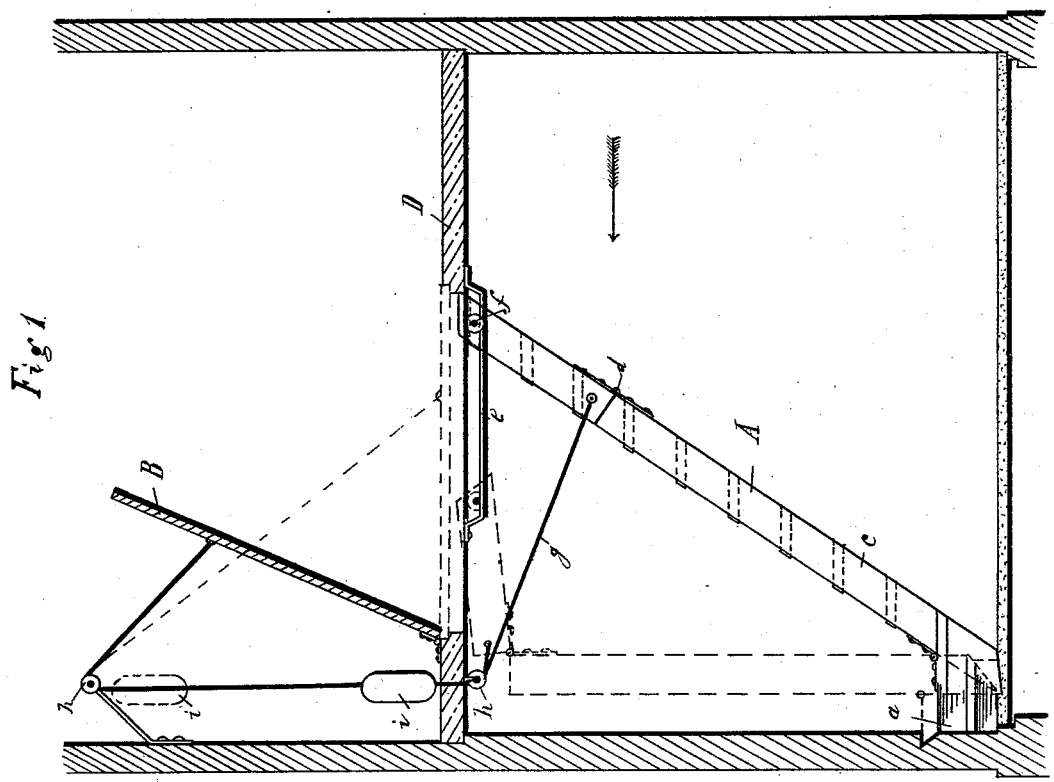
Fig. 1
Witnesses:
E. B. Bolton
H. van Oldenneel
Inventor:
Ernst Friedrich Grossé
By 
his Attorneys.

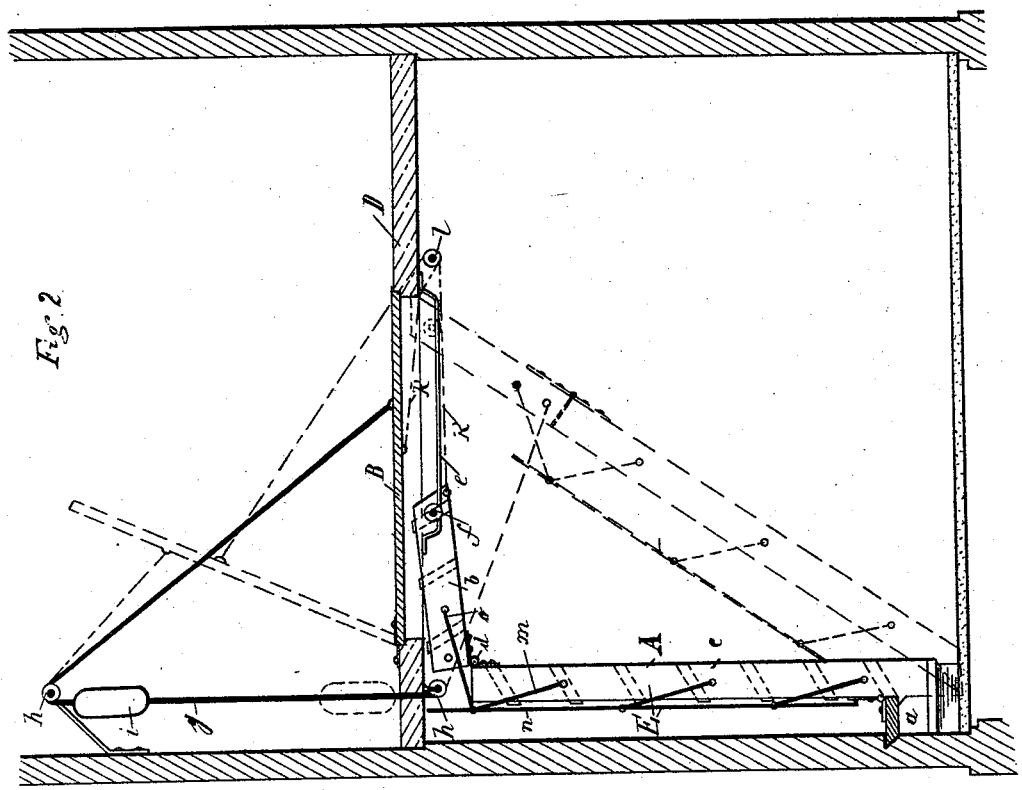

(No Model.) 3 Sheets—Sheet 3.
E. F. GROSSÉ.
TRAP DOOR STAIRS.
No. 527,852. Patented Oct. 23, 1894.
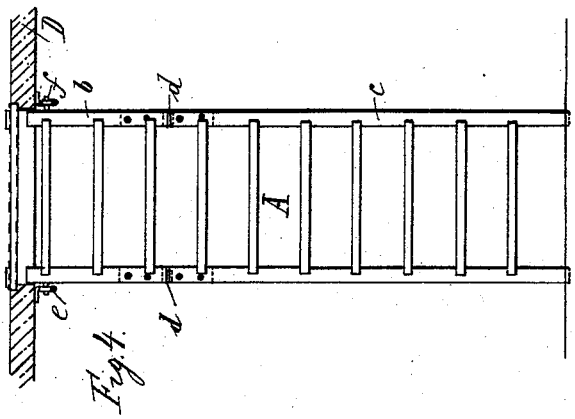
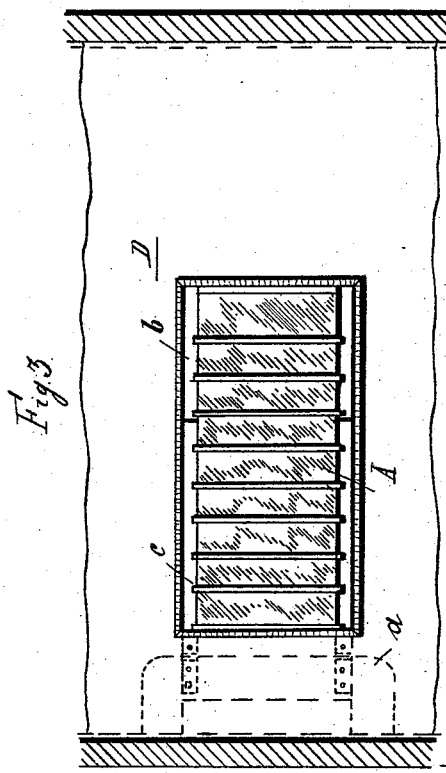
Witnesses:
E. B. Bolton
H. van Oldenneel
Inventor:
Ernst Friedrich Grossé
By Richardson
his Attorneys.
THE NORRIS PETERS CO., PHOTO-LITHO., WASHINGTON, D. C.

UNITED STATES PATENT OFFICE.

ERNST FRIEDRICH GROSSÉ, OF GROSS-KRAUSSNIGK, GERMANY.

TRAP-DOOR STAIR.

SPECIFICATION forming part of Letters Patent No. 527,852, dated October 23, 1894.

Application filed March 30, 1894. Serial No. 505,734. (No model.)

*To all whom it may concern:*

Be it known that I, ERNST FRIEDRICH GROSSÉ, a subject of the King of Prussia, German Emperor, residing at the village of Gross-Kraussnigk, near Brenik, in the Kingdom of Prussia, Germany, have invented certain new and useful Improvements in Trap-Door Stairs, of which the following is a specification.

The object of my invention is to provide a form of ladder or stairs under a trap door, capable of being folded to one side so that the entire room beneath the trap door can be utilized.

In the annexed drawings Figure 1, is a longitudinal section of my device, the trap door being open and the stairs ready for use. Fig. 2, shows my device when not in use. Fig. 3, is a plan view with the trap door raised. Fig. 4, is a view in the direction of the arrow in Fig. 1.

In the construction represented the lower extremity of the stair A rests against a projection a from which the stairs are climbed. In order to make it possible to utilize the entire room under the trap door the stair A is constructed of two pieces, the top piece b being hinged to the lower part c. The upper part b of the body of the stairs is guided over rails e by rollers f under the floor D and is connected with the trap door B by means of a rope g which is fixed to said trap door, passing over rollers h in such a manner that when the stair A is put in position to be used (Fig. 1) the trap door B is opened and when the stair is thrown backward so that it cannot be used (Fig. 2) the trap door is closed.

A counterweight i fixed to the rope g serves to compensate the weight of the trap door B.

It is evident that in using the stair A in connection with the trap door B the room underneath said trap door can be used entirely as long as the trap door is closed.

Another great advantage of my construction is that accidents are prevented while the trap door is open by the fact that the stairs being located underneath the opening the height of a fall is reduced to a minimum.

The construction shown in Fig. 1 enables me to work the trap door B by means of the stairs A from below; but if it is desired to go down stairs and the trap door is closed it will be necessary to provide other means to work the stairs. For this purpose I use the rope k starting from the trap door B shown by dotted lines in Fig. 2, which is conveyed or guided to the upper part b of the stair A over a roller l.

When the trap door is lifted the rope k pulls the stair part b forward in the direction of the arrow of Fig. 2 and brings the stair A in the position of use shown by dotted lines. By this arrangement of the two ropes g and k and by the manner in which they are connected with the trap door B and the stair A it is possible to make the stair A work either from the room below or from the room above.

In Fig. 1 I show a stair without railing. It will however, be very easy to provide the same with a railing as shown in Fig. 2 connected in such a manner with the part b that a change of position of the latter will cause a corresponding change of position of the railing. To that effect the railing E consists of stays m which are connected pivotally with the side beam of the stair and connected between themselves by the rail n. A strip o catches the upper support or stay m the pivotal point of which is located at the movable side cheek of the upper part of the stair. It will be clear that when the stair is pushed backward the railing E is pushed downward by the strip or rail o and that when the stair is pulled forward so that it can be utilized the railing is brought back in the required position.

If it is desired to utilize the entire room below the trap door it will be possible to leave off the projection a and to construct the stair so that when the same is pushed backward it rests directly against the wall or in a recess in said wall.

I claim—

In combination with the floor D, a trap door thereon, horizontal guides on the under part of the floor, a ladder having its upper end supported by said guides, a hinged joint in said ladder, and an operating connection from the trap door to the upper section of the ladder, whereby in the closing of the trap door, the ladder is moved horizontally and the parts thereof broken at the hinge, substantially as described.

In witness whereof I have hereunto set my hand in presence of two witnesses.

ERNST FRIEDRICH GROSSÉ.

Witnesses:
G. WILLNER,
L. A. EDWARDS.